United States Patent [19]

van de Polder

[11] Patent Number: 4,607,282

[45] Date of Patent: Aug. 19, 1986

[54] TELEVISION CIRCUIT FOR THE REDUCTION OF FLICKER ON A DISPLAY

[75] Inventor: Leendert J. van de Polder, Eindhoven, Netherlands

[73] Assignee: U.S. Philips Corporation, New York, N.Y.

[21] Appl. No.: 615,964

[22] Filed: May 31, 1984

[30] Foreign Application Priority Data

Jun. 1, 1983 [NL] Netherlands ............... 8301937

[51] Int. Cl.⁴ ............................................. H04N 7/01
[52] U.S. Cl. .................................... 358/140; 358/214
[58] Field of Search .......... 358/140, 11, 313, 214–216; 360/11.1, 311, 313

[56] References Cited

U.S. PATENT DOCUMENTS 3,882,539  5/1975  Faroudja .................. 358/140 X
3,886,589  5/1978  Nasu .................... 360/11.1 X

*Primary Examiner*—James J. Groody
*Assistant Examiner*—Victor R. Kostak
*Attorney, Agent, or Firm*—Thomas A. Briody; Jack Oisher; William J. Streeter

[57] ABSTRACT

The television circuit is suitable for use with a television picture signal originating from a tele-cine converter (1) which operates at a cine film display rate of 24 frames per second and a 60 Hz field frequency. The picture signal has cycles of alternately two and three field periods with the same picture information which, on display, results in flicker phenomena. To reduce flicker on display of the picture signal on a display screen, the picture signal is applied directly and by a delay device (5) producing a time delay of at least two or more whole field periods to a signal combining circuit (6) which is in the form of a matrix circuit and is followed by a change-over circuit (7). The matrix circuit (6) produces signal combinations in the output picture signal which on display result in flicker reduction.

5 Claims, 4 Drawing Figures

TELEVISION CIRCUIT FOR THE REDUCTION OF FLICKER ON A DISPLAY

BACKGROUND OF THE INVENTION

The invention relates to a television circuit for the reduction of flicker on a display, for a picture signal whose picture information repeats itself in cycles of two consecutive field periods. The circuit includes, an input terminal having a delay device coupled to the input terminal producing a time delay equal to two or more whole field periods. A signal combining circuit is coupled to the input terminal and to an output of the delay device. A switching circuit is coupled between an output of the signal combining circuit and an output terminal for forming together combined picture signals having during field periods picture information originating from different field periods.

Such a television circuit is disclosed in the U.S. Pat. No. 3,886,589 more specifically for use in a so-called "field skip" signal storage and display device. Before signal storage is effected, the combined picture signals are formed with the aid of the delay device and the signal combining circuit. Of these combined picture signals alternate picture signals are stored (field skip) during field periods through the switching circuit. Signal storage may be effected every other field period. On display of the stored signal by the signal storage and display circuit the stored information is repeated once, in the subsequent field period. Thus, the television picture signal obtained contains picture information which repeats itself in cycles of two consecutive field periods with a possible step change of picture content therebetween. Forming the combined picture signals prior to storage according to the patent has for its object to effect a reduction in flicker phenomena on display in a display device of the step-changing picture signal.

In addition, the patent describes that a step-changing picture signal may be the result of a tele-cine conversion. Herein, when the cine film is displayed at a rate of 25 frames per second and with a field frequency of 50 Hz, the information associated with one cine film frame is not included in one field period of the picture signal but is repeated in the subsequent field period. FIG. 7 of the patent further shows that when a cine film is displayed at a rate of 24 frames per second and with a field frequency of 60 Hz, 12 frames out of the 24 frames are included, repeated alternately once and twice in 2×12+3×12=60 field periods. If thereafter, optionally, the described intermittently effected signal storage of combined picture signals is used, the storage and display circuit will produce during signal display an adapted step-wise changing picture signal.

Apart from the fact that in both cases flicker reduction is obtained to some degree by forming the step-changing picture signal to be displayed on a display screen prior to signal storage, and combining the picture signals over several field periods, the step-change following the repetition of information in the cycle will produce flicker. The patent does not propose measures to counteract this.

SUMMARY OF THE INVENTION

The invention has for its object to provide a television circuit for the reduction of flicker on a display for a picture signal originating from a tele cine converter which is operative at a cine film display rate of 24 frames per second and with a field frequency of 60 Hz. The picture signal cycles comprise alternately two and three field periods. According to the invention, the picture signal is applied to the input terminal of the television circuit. The signal combining circuit is in the form of a matrix circuit having at least three outputs for supplying different signal combinations of undelayed and delayed picture signals. The switching circuit is in the form of a change-over circuit for connecting during a field period one of the outputs of the matrix circuit to the output terminal, the change-over circuit being cyclically operated over a period of five field periods.

In one embodiment of a television circuit according to the invention, the shortest possible time delay is combined with an acceptable signal-to-noise ratio deviation between the signals combined per field period. A delay device having a time delay equal to two field periods is used. The matrix circuit has five outputs for supplying five different signal combinations which are formed in a normalized way from one fifth, two-fifths, three-fifths, four-fifths and half of the signal values of the undelayed and delayed picture signals.

Another embodiment in which the matrix circuit acts as a signal combining circuit, and the change-over circuit are of as simple a construction as possible, and an acceptable signal-to-noise ratio deviation between the signals combined in each field period included present, is a delay device having a time delay equal to four field periods. The matrix circuit has three outputs for supplying three different signal combinations which are formed in a normalized way from two-fifths, three-fifths and half of the signal values of the undelayed and delayed picture signals.

DESCRIPTION OF THE FIGURES

The invention will now be further described by way of example with reference to the accompanying drawing, wherein.

DESCRIPTION OF THE PREFERRED EMBODIMENT

Figure 1:
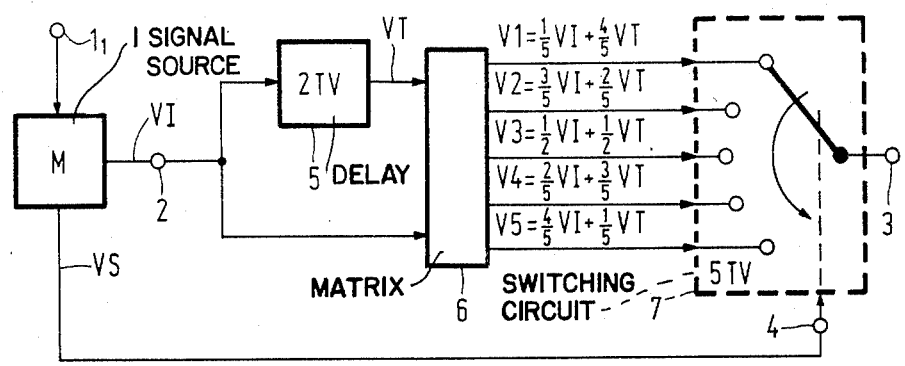
FIG. 1 shows a block diagram of a television circuit according to the invention and FIG. 2 shows some timing diagrams to illustrate the operation of the circuit shown in FIG. 1, and FIGS. 3 and 4 also show a further block diagrams and some associated timing diagrams.
Figure 2:
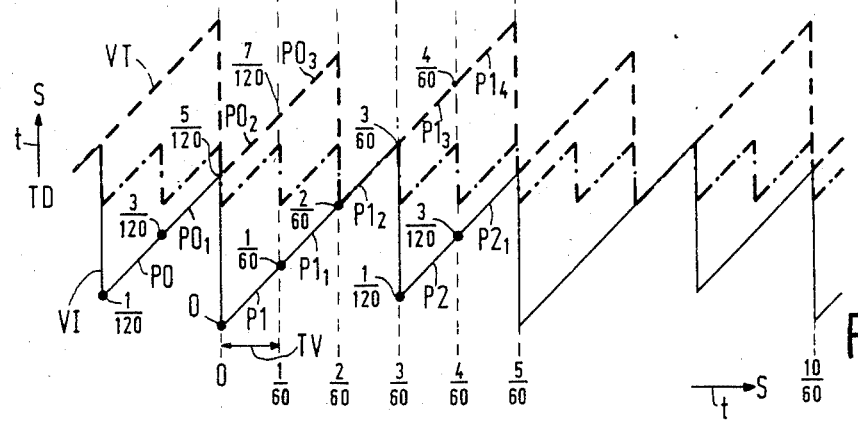

In the television circuit shown in FIG. 1, reference numeral 1 denotes a signal source. The signal source 1 produces two signals VS and VI. The signal VI is a line and field-sequential television picture signal or video signal when picture information is combined with line and field synchronizing information present in blanking periods. Whether synchronizing information is present or absent, it is assumed that the signal VI comprises a picture signal with picture information which repeats itself in cycles of two and three consecutive field periods and possibly with a step-change therebetween. For producing such a signal VI the signal source 1 may, for example, comprise a cine film-to-television (tele-cine) converter which operates with a film display rate of 24 frames per second and with a field frequency of 60 Hz. To illustrate the mode of operation of the circuit shown in FIG. 1, FIG. 2 shows some timing diagrams suitable therefor as a function of the time t. In FIG. 2 some items of cine film picture information are indicated by M0, M1, M2, M3 and M4 in a timing diagram denoted by M, of a sequence of items per film picture information.

With the tele-cine conversion which may be effected in a known manner with a continuous or intermittent film feed-forward with or without flashed light illumination, the information associated with one cine film frame not only occurs in one television field period TV, but it repeatedly occurs alternately once or twice in the subsequent field period or periods. FIG. 2 shows for the cine film picture information M1 and M2 respectively the cycle of repeating picture information has a duration of 3 TV and 2TV, respectively. At the frames of cine film picture information M3 and M4 5TV indicates the duration of the periodical cine film picture information processing. The field period TV has a duration of 1/60 s, it being assumed that the rate at which the cine film is displayed is equal to 24 frames per second.

FIG. 2 shows the time diagram of the signal VI with the television picture information items P. The cine film picture information M0 results in two items of television picture information P0 and P0$_1$, the subsequent cine film picture information M1 resulting in three times of television picture information P1, P1$_1$ and P1$_2$. The indices 1 and 2 at the signal VI denote the first and second repetitions of the tele-cine picture information conversion. Likewise, it follows for the items of cine film picture information M2, M3 and M4 that they respectively result in items of television picture information P2, P2$_1$; P3, P3$_1$, P3$_2$ and P4, P4$_1$. From the signal VI shown in FIG. 2 and containing the television picture information items P, it follows that the picture signal is formed from picture information items P (P0, P1, P2, etc.) which are repeated in two alternating cycles of two and three field periods TV with step-changes possibly occurring therebetween. These step-changes in the information will frequently occur in the form of abrupt changes due to editing separately filmed scenes. Without further measures the display of the abrupt, step-changing signal VI will result in flicker phenomena on a display screen.

At the signal VS of FIG. 2, TV1 and TV2 denote field periods which are assumed to belong to a single, 2:1 interlaced and, possibly, standardized television system. The two field periods TV1 and TV2 form together a picture or frame period in the television system. Cycles of five field periods TV comprising signal components V1, V2, V3, V4 and V5 are further shown in the timing diagram of the signal VS of FIG. 2. As will be further evident from the description, these signal components are formed by signal combinations. The description will also show that the signal VS is operative as a change-over signal. For the sake of completeness it should be noted that the signal VS has a period of 10 TV relative to complete picture or frame periods TV1+TV2 during which as can be seen from the time diagram VS of FIG. 2, for pairs of periods 3TV+2TV=5TV start with a field period TV1 and the following period of 5TV starts with a field period TV2.

FIG. 1 shows that the signal VI containing the items of television picture information P is applied to an input terminal 2 of a television circuit of the invention, which has an output terminal 3 and a further input terminal 4 for receiving the signal VS. The input terminal 2 is connected directly and through a delay device 5 to a signal combining circuit 6 which is in the form of a matrix circuit. At the delay device 5 it is indicated that it produces a time delay equal to two field periods (2TV). FIG. 1 shows that the delay device 5 produces a delayed signal VT whose timing diagram is shown in FIG. 2, 2TV denoting the time delay between the signals VI and VT.

In FIG. 1 the circuit 6 has five outputs connected to five inputs of a switching circuit 7 which operates as a change-over circuit. The circuit 7 has a switching control input which is connected to the input terminal 4, and an output connected to the output terminal 3. At the outputs of the circuit 6 FIG. 1 indicates that the following normalized signals are supplied:

$V1 = 1/5 VI + 4/5 VT,\ V2 = 3/5 VI + 2/5 VT,$
$V3 = \frac{1}{2} VI + \frac{1}{2} VT,\ V4 = 2/5 VI + 3/5 VT$ and
$V5 = 4/5 VI + 1/5 VT.$ It is apparent that the delay device 5, the circuit 6 and the circuit 7 together provide that at the output terminal 3 combined picture signals occur having during field periods items of picture information originating from different field periods. As a result thereof, in a manner still to be described, flicker in the signal occurring at the output terminal 3 will be reduced on display on a display screen.

In FIG. 1, the circuit 7 is shown, for the sake of simplicity partly as a mechanical change-over circuit, but in practice it will be in the form of an electronic change-over circuit, the signal VS acting as a change-over signal. From the timing diagram shown in FIG. 2 of the signal VS it follows that the circuit 7 has a switching cycle whose duration is equal to 5TV.

To explain the flicker reduction obtained the following holds. Associated with the cine film display rate of 24 frames per second is a sequence of cine film picture information M which in FIG. 2 is shown partly by solid and partly by dashed lines. The solid lines between the items of information M0 and M1, M2 and M3, etc. indicate a cine film picture alternation, dashed lines indicating a cine film picture alternation between the items of information M1 and M2, M3 and M4, etc. It can be seen from the signals VS and VI of FIG. 2 that the alternation in the television picture sequence occurs with a time shift, as the cine film picture alternation occurs halfway a field period with which the signal component V3 is associated. As a result thereof, the cine film frame change present in the cine film which always occurs after 1/24 s occurs after the cine film-television conversion in the picture signal VT with a time delay of $\frac{1}{2}$ TV as shown in FIG. 2. Put differently, the television picture information items P2, P2$_1$; P4, P4$_1$, etc. become available, compared with the cine film picture information items M2, M4 etc., $\frac{1}{2}$ TV = 1/120 s too late for the television display. In FIG. 2 two timing axes t are plotted at a time diagram TD. Some periods of time from an assumed instant 0, the field period TV being equal to 1/60 s, are plotted along one of the time axes. Time delays are plotted along the other timing axis t in the time diagram TD. By means of solid lines, the time delay variation of the signal VI is shown at TD. Starting from an assumed time delay 0 at the beginning of the processing of the cine film picture information M1, time delays associated with the final instants of the information items P1, P1$_1$ and P2 are indicated at TD by 1/60, 2/60 and 3/60 seconds. Subsequent thereto the information P2 in the signal VI becomes available, however, delayed by 1/120 s, as is shown at (TD, VI) in FIG. 2. The likewise delayed starting moment of the information P2$_1$ has a delay of 3/120 s.

From the time diagram (TD, VI) of FIG. 2 it follows that when the signal VI is directly displayed on a television screen, jitter in the displayed picture may occur. Abrupt picture information changes between the items of cine film information Mo, M1, M2, M3, M4 etc. occur in the alternating cycles of 3TV and 2TV in the signal VI and result in flicker phenomena on display. Abrupt changes in picture information between M1 and M2, M3 and M4 etc. occur with a delay of a further 1/120 s compared to the original scene information in the television picture. This also results in flicker on display.

According to the invention, flicker reduction in the display on a display screen can be accomplished if the variation in the time delay over the period 5TV in the time diagram (TD, VI) is corrected. To that end, the signal components V1, V2, V3, V4 and V5 in accordance with the equation shown in FIG. 1 are formed from the signals VI and TD. The timing delay in the signal VT is plotted in the timing diagram TD of FIG. 2 by means of dashed lines. This time delay is plotted along both time axes t to the right and upwards. In the time delay of the signal VT plotted in the timing diagram (TD, VT) the electronically produced time delay of 2TV is added by the delay device 5 of FIG. 1 to the jittery time delay associated with the tele-cine conversion. The picture information items P1, P1$_1$ and P1$_2$ of the signal VI, shown by means of solid lines at TD result in the dashed-line picture information items P1$_2$, P1$_3$ and P1$_4$ of the signal VT. Likewise, the picture information items P0$_2$ and P0$_3$, delayed by 2TV=4/120 s are obtained from the picture information items P0 and P0$_1$ of the signal VI. Forming the signal combinations V1, V2, V3, V4 and V5 in accordance with the equations shown in FIG. 1 results in a signal at the output terminal 3 whose time delays are plotted by means of dot-and-dash lines in the timing diagram TD. In the timing diagrams TD instants are shown at the signals VI and VT with the aid of which, using the formulae shown in FIG. 1, the dot-and-dash time delay variation can be calculated. It will be obvious that the time delay variation in the signal at the output terminal 3 always varies between 2/60 s and 3/60 s for all the signal components. This results, when the signal thus obtained is displayed on a display screen, in flicker reduction.

The circuit shown in FIG. 1 has the advantage that a delay device 5 can be used which produces the shortest possible time delay 2TV. It is then necessary to provide the circuit 6 with five outputs for the supply of the five different signal combinations V1 to V5 which can be formed in a normalized manner from one-fifth, two-fifths, three-fifths, four-fifths and half of the signal values of the undelayed and delayed picture signal VI and VT, respectively. Compared with the choice V3=VI or V3=VT the signal combination V3=½VI+½VT has the advantage that it improves the signal-to-noise ratio by 3 dB as the linear addition (doubling) is accompanied by a noise contribution of a factor of $\sqrt{2}$.

In the circuit shown in FIG. 1 the signal source 1 applies the switching signal VS in the proper phase to the switching circuit 7. The timing diagrams M, VS and VI of FIG. 2 are coupled to each other in the proper phase by the signal source 1 of FIG. 1 in which the tele-cine conversion is effected in the manner described.

An alternative possibility is that the tele cine conversion is not effected in the signal source 1 itself at the cine film display rate of 24 frames per second and the 60 Hz field frequency, but elsewhere before the signal source, a step-changing picture signal being applied as a result thereof to an input terminal 1$_1$ of the signal source 1 which picture signal is conveyed further, for example without change, as the signal VI. So as to obtain the switching signal VS in the proper phase, information about the picture signal cycles with alternately the two and three field periods must now be derived from the received signal (VI) itself. To realise a circuit for obtaining an indication which picture information items in the sequence of field periods TV are associated with each other, reference is made to applicants non-prepublished patent application (PHN 10.596). In the presence of such a circuit in the signal source 1, a step-changing picture signal received from elsewhere can be applied to the input terminal 1$_1$ of the signal source 1 for producing the signals VS and VI. Broadcast/television receivers are examples thereof.

Figure 3:
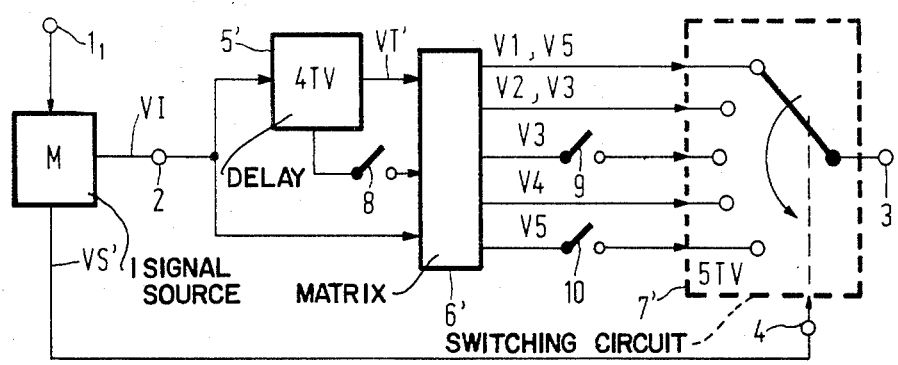
Figure 4:
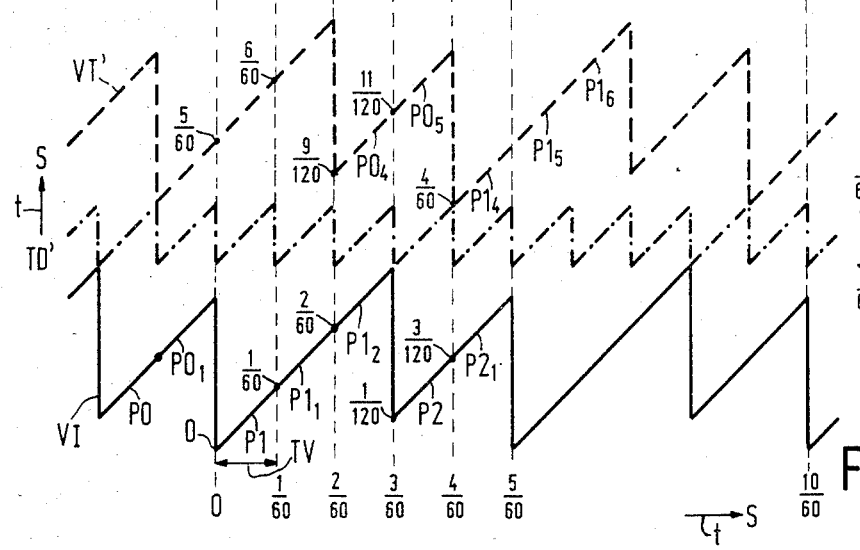

FIG. 3 shows a further embodiment of a television circuit according to the invention, comprising a delay device 5' producing a time delay equal to a duration of 4TV. In the circuit shown in FIG. 3 components which are identical to those already described with reference to FIG. 1 are given the same reference numerals. Slightly different components are provided with a prime. The circuit 5' applies the picture signal VT' delayed by a duration of 4TV to the signal combining circuit 6' which is in the form of an adapted matrix circuit and is followed by the likewise adapted (changeover) switching circuit 7'. An adapted switching signal VS' is applied to the circuit 7'. FIG. 4 shows timing diagrams M, VS', VI and VT', which are comparable to those shown in FIG. 2, extended by a timing diagram TD' by means of the two timing axes t. Plotted at the time diagrams of the signal VI and VT' is the time delay having a duration of 4TV. By way of example, it is mentioned that the television picture information item P1 and the picture information items P1$_1$ and P1$_2$ of the signal VI delayed once and twice during the cine film-to-television conversion results in electronically delayed items of picture information P1$_4$, P1$_5$ and P1$_6$ in the signal VT'.

In FIG. 3 the delay device 5' is shown to have a further output which is connectable to the circuit 6' by an on/off switch 8. If the switch 8 is closed, the condition not shown, picture information delayed by a time delay of 2TV can be applied from the circuit 5' to the circuit 6' and used therein for a picture signal combining action of a higher order.

Signal combinations are denoted at the outputs of the circuit 6' by (V1, V5); (V2, V3); V3; V4 and V5. On/off switches 9 and 10, respectively which are both in the off-condition are shown in the drawing between the circuit output carrying the combination V3 and V5, respectively and the input of the switching circuit 7'. Associated therewith is the time diagram shown in FIG. 4 of the switching signal VS'. FIG. 4 shows that in a switching cycle of a duration of 5TV a switching action is effected three times, more specifically between the signal combinations V1 and V2, V3 and V4, and V4 and V5, so that only three signal combinations are required, more specifically in accordance with the equations:

$$V1, V5 = \frac{2}{5} VI + \frac{3}{5} VT, V2, V3 = \frac{3}{5} VI + \frac{2}{5} VT \text{ and } V4 = \frac{1}{2} VI + \frac{1}{2} VT.$$

The timing diagram TD' shown in FIG. 4 with the time delays for the signals VI (solid lines) and VT' (dashed lines) and the dot-and-dash variation of the combined signal at the output terminal 3 are associated with the above formulae for the signal combinations (V1, V5); (V2, V3) and (V4). As is described with reference to FIG. 2, the irregularly proceeding time delay is illustrated by the solid lines, converted into the dot-and-dash uniform variation of the time delay between 3/60 s and 4/60 s. On display of the signal occurring at the output terminal 3 flicker reduction occurs.

The embodiment of the television circuit, described with reference to FIG. 3 comprises circuits 6' and 7' of as simple a construction as possible having three outputs and inputs, respectively. From the specific formulae for the signal combinations (V1, V5); (V2, V3) and (V4) it follows that they are formed in a normalized way from two-fifths, three-fifths and half of the signal values of the undelayed picture signal VI and the delayed picture signal VT'. The signal combinations formed from 2/5, ½ and 3/5 of the signals implicate a signal-to-noise ratio deviation between the field periods which is so small as to be disregarded.

The variations in the time delays (TD) of the signals VI and VT shown in FIG. 2, do not allow for a different choice for the relevant equations for the signal combinations V1, V2, V3, V4 and V5 (FIG. 1), disregarding the choice V3=VI or V3=VT. For the timing diagram TD' of FIG. 4 there are indeed other choices. The dot-and-dash lines shown illustrate the variation of the time delay between the values of 3/60 and 4/60 s. A first limit variation is the variation between 2/60 s and 3/60 s. Associated therewith are the following equations:

$$V1 = \tfrac{3}{5} VI + \tfrac{2}{5} VT, \quad V2 = \tfrac{4}{5} VI + \tfrac{1}{5} VT, \quad V3 =$$

$$VI, \quad V4 = \tfrac{7}{10} VI + \tfrac{3}{10} VT \text{ and}$$

$$V5 = \tfrac{4}{5} VI + \tfrac{1}{5} VT.$$

As it holds for the combinations V2 and V5 that they are equal, four outputs or inputs, respectively of the circuit 6' or the circuit 7', might be used. A second limit variation is the variation between 4/60 s and 5/60 s. Associated therewith are the following equations:

$$V1 = \tfrac{1}{5} VI + \tfrac{4}{5} VT, \quad V2 = \tfrac{2}{5} VI + \tfrac{3}{5} VT, \quad V3 =$$

$$\tfrac{1}{5} VI + \tfrac{4}{5} VT, \quad V4 = \tfrac{3}{10} VI + \tfrac{7}{10} VT$$

$$\text{and } V5 = VT.$$

As the combinations V1 and V3 are equal four outputs can also be used here. Intermediate variations may be chosen. An example of such a variation is a variation between 5/120 s and 7/120 s, with which the following combinations are associated:

$$V1 = \tfrac{1}{2} VI + \tfrac{1}{2} VT, \quad V2 = \tfrac{7}{10} VI + \tfrac{3}{10} VT,$$

$$V3 = \tfrac{4}{5} VI + \tfrac{1}{5} VT \text{ and}$$

-continued $$V4 = V5 = \tfrac{3}{5} VI + \tfrac{2}{5} VT.$$

In all the choices described and choices which can be further derived, the same time delay variation for all field periods is present in the signal at the output terminal 3, which results in flicker reduction.

What is claimed is:

1. A television circuit for reducing display flicker induced from a picture signal which is periodic over a plurality of video field periods comprising:
   (a) an input terminal;
   (b) an output terminal;
   (c) a delay device connected to receive a signal from said input terminal and delaying said signal for at least two video field periods;
   (d) a signal combining circuit for combining a signal from said delay device and a signal from said input terminal, said signal combining circuit having multiple outputs, each providing a different signal for supplying different combinations of a delayed signal VT and an undelayed signal VI, the number of combinations being equal to the number of video field periods in said periodic picture signal; and
   (e) switching means for sequentially selecting a signal from each of said multiple outputs in synchronism with said video field periods, and applying said selected signal to said output terminal during each field period.

2. A television circuit as claimed in claim 1, wherein said delay device has a time delay equal to two field periods, and the signal combining circuit has five outputs for supplying five different signal combinations which are formed from one-fifth, two-fifths, three-fifths, four-fifths and half of the signal values of the undelayed and delayed picture signals.

3. A television circuit as claimed in claim 1, wherein said delay device has a time delay equal to four field periods, and the signal combining circuit has three outputs for supplying three different signal combinations which are formed in a normalized way from two-fifths, three-fifths and half of the signal values of the undelayed and delayed picture signals.

4. The television circuit of claim 1, wherein each of said delayed VT and undelayed signals VI are combined in the relationships $$\tfrac{1}{5} VI + \tfrac{4}{5} VT,$$

$$\tfrac{3}{5} VI + \tfrac{2}{5} VT,$$

$$\tfrac{1}{2} VI + \tfrac{1}{2} VT,$$

$$\tfrac{2}{5} VI + \tfrac{3}{5} VT; \text{ and}$$

$$\tfrac{4}{5} VI + \tfrac{1}{5} VT.$$

5. The television circuit of claim 1 wherein each of said delayed and undelayed signals are combined in fractional proportions proportional to the number of video field periods in said periodic picture signal.

* * * * *